United States Patent [19]

Maier et al.

[11] Patent Number: 4,739,871
[45] Date of Patent: Apr. 26, 1988

[54] DEVICE FOR LIFTING WORK PIECES AND WORK PIECE SUPPORTS FROM A CONVEYOR BELT

[75] Inventors: Gernot Maier; Klaus Bonk, both of Stuttgart, Fed. Rep. of Germany

[73] Assignee: Robert Bosch GmbH, Stuttgart, Fed. Rep. of Germany

[21] Appl. No.: 897,785
[22] PCT Filed: Oct. 25, 1985
[86] PCT No.: PCT/DE85/00415
 § 371 Date: Jul. 15, 1986
 § 102(e) Date: Jul. 15, 1986
[87] PCT Pub. No.: WO86/02869
 PCT Pub. Date: May 22, 1986

[30] Foreign Application Priority Data

Nov. 16, 1984 [DE] Fed. Rep. of Germany ....... 3441965

[51] Int. Cl.[4] .............................................. B65G 47/00
[52] U.S. Cl. ................................ 198/346.1; 198/346.2; 254/104
[58] Field of Search ................... 198/345, 346.1, 346.2; 269/309; 254/104

[56] References Cited

U.S. PATENT DOCUMENTS 1,347,778 7/1920 Hanson .
1,499,560 7/1924 Stangeland .
3,543,903 12/1970 Lodige .............................. 254/104 X
4,148,400 4/1979 Cross .................................... 198/345
4,600,095 7/1986 Brems et al. ...................... 198/346.2

FOREIGN PATENT DOCUMENTS 763919 7/1954 Fed. Rep. of Germany .
55-164453 12/1980 Japan .
547496 8/1942 United Kingdom .
2038671 7/1980 United Kingdom .

Primary Examiner—Robert J. Spar
Assistant Examiner—D. Glenn Dayoan
Attorney, Agent, or Firm—Michael J. Striker

[57] ABSTRACT

A device for lifting work pieces and work piece supports from a conveyor belt and for supporting against operating pressure includes a base, a lift table and a slide disposed therebetween. The slide is movable by means of an adjustment drive between a first end position and a second end position. At least one of the parts is provided with lift faces which are formed by a peripheral segment of a cylinder element. Counter faces which cooperate with the lift faces are formed by rotatably mounted lift rollers which in the operating position of the lift table are released from pressure by supporting faces provided on the base, the lift table and the slide. This device is characterized by short adjustment paths of the slide, low friction faces and also by the end positions of the slide which should not be exactly defined and maintained.

6 Claims, 2 Drawing Sheets

DEVICE FOR LIFTING WORK PIECES AND WORK PIECE SUPPORTS FROM A CONVEYOR BELT

BACKGROUND OF THE INVENTION

The invention relates to a device for lifting work pieces or work piece supports from a conveyor belt. In a known device of this type support faces are formed on a slide, where the counter faces are formed on a lift table. The counter faces are flat wedge surfaces, by means of which the lift table supports on the slide and thereby on the foundation. The known arrangement is disadvantageous in that the slide must travel a relatively large path for obtaining a certain lift, or additional means must be provided in the two end positions of the slide for arresting the slide. Moreover, the forces for moving the slide are relatively large due to the sliding friction. Furthermore, the lift faces and the counter faces are subjected to severe stress because the operating pressure is transmitted by these faces.

SUMMARY OF THE INVENTION

It is an object of the present invention to provide an improved lifting device for lifting work pieces from a belt conveyor. The inventive device is advantageous because of a favorable relationship of the lift to the adjustment movement of the slide, whereby only a rolling friction is generated, so that also a lower drive output for the slide is required. The lift rollers are relieved from the support pressure in the operating position of the lift table and the two end positions of the slide do not have to be exactly defined, so that special means are eliminated.

A particularly friction poor drive is obtained if the support faces are designed so that during the movement of the slide into the second end position the lift table is at first lifted beyond its operating position and can then be lowered to the support faces of the slide which in the meantime have moved below the support faces of the lift table.

For forming the support faces it is suggested to use cylinder elements which preferably are connected with the supporting parts of those cylinders. A prelift element of a smaller diameter may be provided in an advantageous manner in front of the cylinder elements at the face opposite to the counter face. The cylinder elements may be made from inexpensive and very accurately-sized parts without an additional treatment of the support faces and may be mounted in a simple manner on the supporting part. The prelift element facilitates the start of the lifting and may also be used for generating a defined prelift, if such a prelift is desired in one of the structural parts.

It is particularly advantageous if the support faces are provided between the slide and the lift table as well as between the slide and the foundation. In this case the slide also performs a lift movement which adds to the relative lift movement of the lift table with respect to the slide. Thus, the lifting of the support faces or the adjustment path of the slide can be correspondingly reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
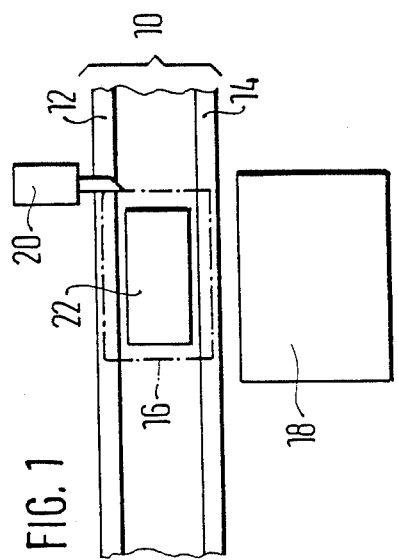
FIG. 1 illustrates a plan view of a work station on a conveyor belt.

A conveyor 10 has two conveyor belts 12 and 14 on which work piece supports 16 are mounted and are taken along by means of friction contact. An abutment 20 is provided for stopping the work piece supports 16 at a work station 18 which is introduceable into the path of movement of the work piece supports 16. Furthermore, a lift device 22 in accordance with the invention is provided on the work station 18 between the conveyor belts 12, 14. This device 22 is used to lift off the work piece supports 16, which are arrested by abutment 20, from conveyor belts 12, 14 and for supporting the supports 16 against the pressure exerted on the work pieces.

The lift device 22 has a foundation or stationary base 24, a lift table 30 which is perpendicularly and displaceably guided in the foundation 24 by means of bolts 26, 28, and a slide 32 which is provided therebetween and is connected with a compressed air actuated adjustment drive 34. Two support bars 36 are provided on foundation 24. Bars 36 are perpendicularly extended in the plane of the drawing and are provided on their upper faces with supporting faces 38. Above the support bars 36, the lift table 30 is provided with two support bars 40 which have support faces 42 and project normally to the lift table. Furthermore, rotary lift rollers 44 are provided on foundation 24 and rotary lift rollers 46 are provided on the lift table table 30. Rollers 46 are positioned above the lift rollers 44 of the foundation 24. The lift rollers 44, 46 are so dimensioned and disposed with respect to support faces 38, 42 that the respective opposing lift rollers 44, 46 do not engage with each other in the fully lowered position of the lift table 30, illustrated in FIG. 2, whereby the opposing support faces 38, 42 engage with each other.

The slide 32 has two support bars 48 extending vertically with respect to the plane of the drawing. Bars 48 have support faces 50 (FIG. 3) which are disposed on the upper and lower ends thereof. Furthermore, two cylinder elements 52 are mounted in each lift roller plane on slide 32. The distance between the cylinder elements as measured in the sliding direction corresponds to the distance between the pair of lift rollers 44,44 and 46,46. In contrast thereto, the relation of the cylinder elements 52 with respect to the support bars 48 of slide 32 deviates from the relation of the lift rollers with respect to the support bars on foundation 24 and lift table 30 by the dimension (FIG. 4), which is described in more detail herein below.

Figure 3:
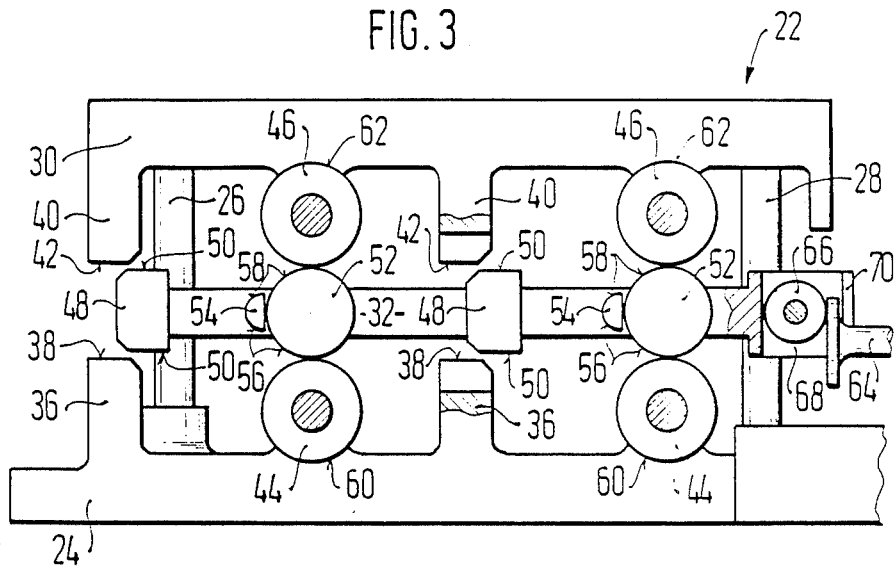

A prelift element 54 is mounted on slide 32 in front of each cylinder element 52. Each prelift element is formed by a bolt having a substantially smaller diameter and a chamfered face which engages on the circumference of the adjacent cylinder element 52. Each pair of parts formed of the cylinder elements 52 and the prelift element 54 represents one lift element having an additional support face 56 facing the foundation 24 and an additional support face 58 facing the lift table 30 (FIG. 3). The counter faces which are cooperating with the additional support faces 56,58 are peripheral faces 60 and 62 of lift rollers 44 and 46, respectively.

Figure 2:
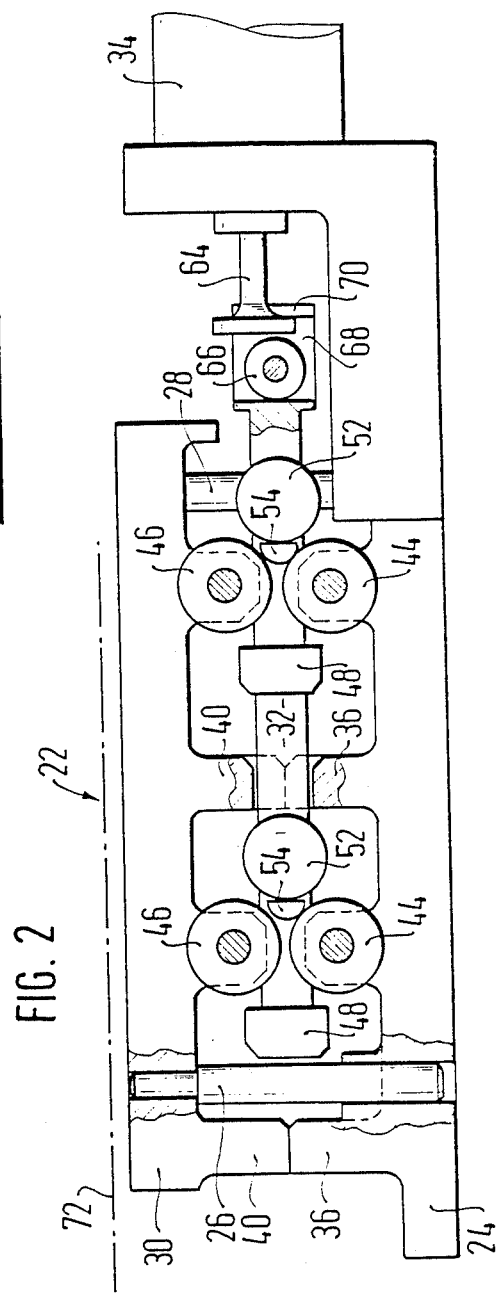
FIGS. 2 and 4 illustrate a side view of the inventive device, partially in a section, in three different positions.

The adjustment drive 34 acts by means of a piston rod 64 on a roller 66 which is rotatably mounted in a fork head 68 of slide 32. Inwardly directed bars 70 are mounted on the free ends of the fork head by means of which the piston rod 64 returns the slide 32 back into its initial position, illustrated in FIG. 2, during the return stroke of the drive. The described device operates as follows:

In the initial position of the device illustrated in FIG. 2 the lift table 30 with its support faces 42 lies on the support faces 38 of the foundation 24. In this position the operating face of the lift table 30 is disposed far below the plane of the conveyor belts, which in FIG. 2 is indicated by the dash-dotted line 72. In this position the lift rollers are relieved from the weight of the lift table 30 and the slide 32 is lowered to a position in which the prelift element 54 engages on the lift rollers 44 of foundation 24. In this position the slide 32 may be additionally supported on shoulders, not shown in the drawing, of foundation 24.

Figure 4:
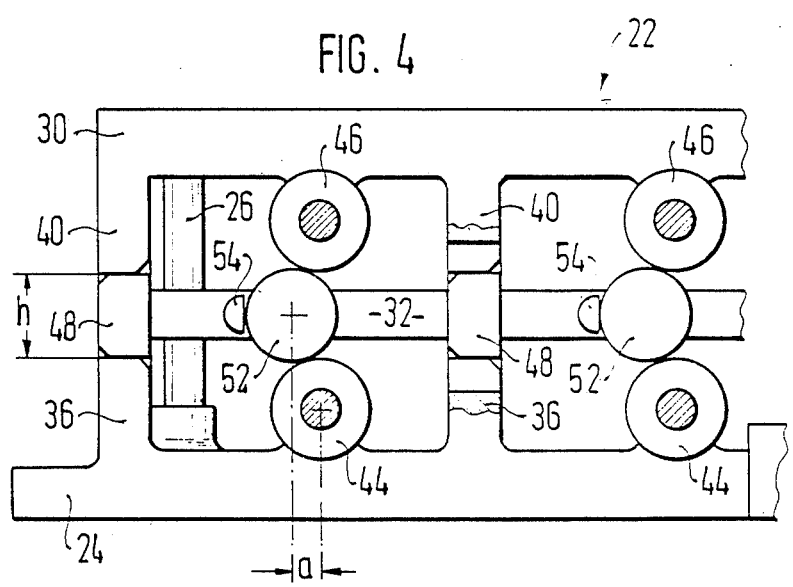

The slide 32 is displaced to the left by the adjustment drive 34 for lifting the lift table 30 into the operating position illustrated in FIG. 4, whereby a locked work piece support 16 above the device is lifted by the conveyor belts 12,14. Thereby, the prelift elements 54 of slide 32 penetrate into the wedge slot between the lift rollers 44 and 46 and push the lift table 30 upwardly, whereby slide 32 also moves upwardly by the half of the traveled stroke. Simultaneously, the support bars 48 of slide 32 approach the support bars 36 and 40 of foundation 24 and lift table 30. The parts are so dimensioned and so chamfered that the support bars 48 of slide 32 can pass unhindered between the support bars to the foundation and the lift table.

During the further process of the displacement movement the lift face segments 56,58 formed on cylinder elements 52 abut on the lift rollers 44,46 and further lift the lift table 30 until the same has reached its highest position illustrated in FIG. 3, which is still above its operating position. In this position slide 32 is still removed from its left end position by the distance a (FIG. 4). Due to the overlifting of lift table 30 slots are formed between the support faces 38,42 and 50, so that slide 32 can at first be moved without a sliding friction between the parts.

During the further movement of slide 32 the lift rollers 44,46 roll off on the rear peripheral faces of the cylinder elements 52, whereby slide 32 and lift table 30 move downwardly. When slide 32 is moved from the position in accordance with FIG. 3 further to the left by the distance a it has reached its second end position illustrated in FIG. 4, wherein the support faces 38,42,50 of the parts engage with each other and the operating face of the lift table 30 has its prescribed height. The tolerances are so dimensioned that in the position in accordance with FIG. 4 the support is performed definitely over the support faces and the lift rollers 44,46 are relieved from the support pressure or operating pressure. This requires that the parts are already in engagement with each other on the support faces for a residual stroke and that the sliding friction between the slide 32 has to be overcome, on the one hand, and the foundation 24 and lift table 30, on the other hand. During resetting the work piece support 16 on the conveyor belts 12,14 the processes run in a reverse sequence.

Advantageously, means for centering and fixing of the work pieces or work piece supports are provided on the lift table 30 which, however, do not belong to the invention and are therefore not illustrated in the drawing.

It will be understood that each of the elements described above, or two or more together, may also find a useful application in other types of devices for lifting workpieces and workpiece supports from a conveyor belt differing from the types described above.

While the invention has been illustrated and described as embodied in a device for lifting workpieces and workpiece supports from a conveyor belt, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for lifting work pieces or work piece supports from a conveyor belt, comprising a stationary base; a lift table; and a movable slide disposed between said base and said table, said base, said lift table and said slide each having support faces; said slide also having additional support faces; a motor driven adjustment drive connected to said slide to move the latter from a first end position to a second end position so as to lift the lift table over the additional support faces of the slide from a first non-operative end position to a second operative end position, wherein the support faces on said lift table, said slide and said base engage with each other and transmit pressure exerted on said table by work pieces to the base, said table and said base including rotatable lifting rollers (44,46) having counter faces (60, 62) which cooperate with the additional support faces (56, 58) formed on said slide, the support faces of said lift table and said slide (42, 50) being displaceable with respect to the additional support faces and the counter faces being relieved from said pressure in a second end position of said slide (32).

2. Device in accordance with claim 1, wherein the additional support faces (56,58) are so formed that the lift table (30) is at first lifted during a movement of said slide (32) to said second operative end position of said lift table (30) to an intermediate position which is above said second operative position and thereafter is lowered so that the support faces (50) of said slide (32) are positioned below the support faces (42) of said lift table and engage the latter.

3. Device in accordance with claim 2, wherein cylinder elements (52) are fixedly connected to said slide (32), said additional support faces (56,58) being formed on circumferences of the cylinder elements (52).

4. Device in accordance with claim 3, wherein a prelift element (54) is mounted next to each cylinder element (52) so that each prelift element forms with an assigned cylinder element a respective additional support face.

5. Device in accordance with claim 4, wherein each prelift element (54) is a stationary bolt provided with a face opposite to the respective cylinder element (52) and having a chamfered face which engages on said cylinder element.

6. Device in accordance with claim 4, wherein the additional support faces (56) on the slide, which face the lift table (30) cooperate with the counter faces (62) formed on the rollers (46) provided on the lift table.

* * * * *